June 11, 1968  P. P. LONGO ET AL  3,387,886
AUTOMOBILE HEADREST

Filed Nov. 23, 1966  2 Sheets-Sheet 1

INVENTORS.
PAUL P. LONGO
ALLEN PARMET
BY Karl L. Spivak
ATTORNEY.

June 11, 1968  P. P. LONGO ET AL  3,387,886
AUTOMOBILE HEADREST
Filed Nov. 23, 1966  2 Sheets-Sheet 2
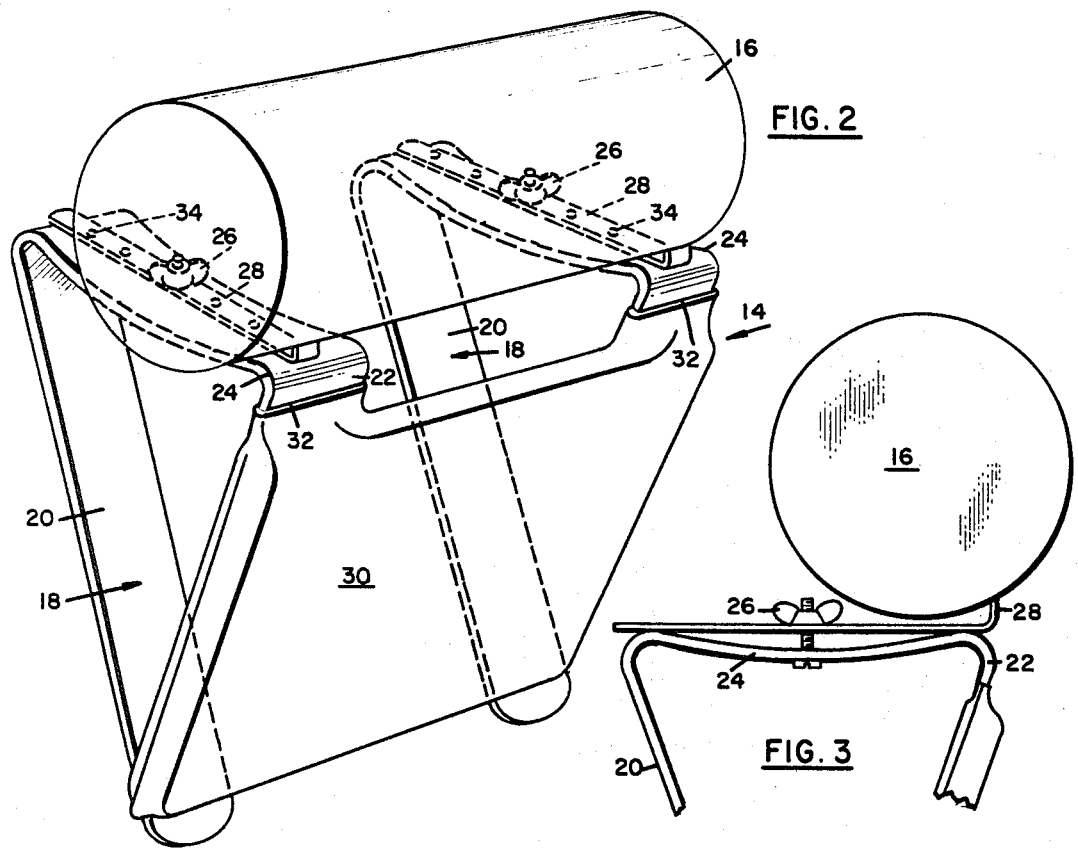
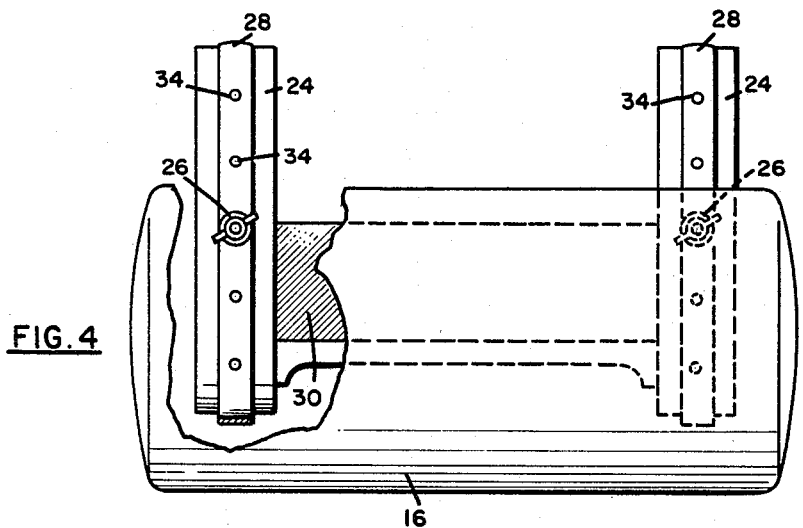
INVENTORS.
PAUL P. LONGO
ALLEN PARMET
BY
*Karl L. Spivak*
ATTORNEY.

3,387,886
Patented June 11, 1968

3,387,886
AUTOMOBILE HEADREST
Paul P. Longo and Allen Parmet, Camden, N.J., assignors to Broadway Manufacturing Company, Camden, N.J., a corporation of New Jersey
Filed Nov. 23, 1966, Ser. No. 596,594
1 Claim. (Cl. 297—397)

ABSTRACT OF THE DISCLOSURE

An automobile headrest comprising a pair of spaced, spring steel, V-shaped brackets, each including an arcuate web and depending front and rear legs wherein the bias of the spring steel brackets is increased by straightening the said arcuate web.

---

The present invention relates to a head-rest assembly and more particularly to a head-rest assembly which can be secured to the back of an automobile seat without damage thereto.

It has been discovered, through research and development, that a headrest secured to the seat in an automobile serves two important functions. The first function being to help prevent fatigue. It is well known that a large percentage of automobile accidents are caused by the driver falling asleep behind the wheel. By providing this support to the driver's head, a great portion of his fatigue is removed, allowing the driver to remain alert for a longer period of time. The second function of the headrest is to prevent "whip-lash" from occurring during a rear end collision. One of the most common medical problems resulting from a rear end collision is the strain on the neck caused by the sudden motion of the head towards the rear. The use of a headrest has resulted in reduced "whip-lash" cases during rear-end collisions.

To date, the only way to install a headrest to the back of an automobile seat would be by drilling, cutting or otherwise damaging the upholstery. The present invention solves this problem by providing a headrest which snaps over the uppermost portion of an automobile seat without causing damage thereto, the headrest being as effective as the permanently installed type.

Another problem encountered with the use of the prior art type headrests is that of adjustability of the headrest for the user's comfort. On the prior art type that has been installed there is no way, short of reinstallation, to adjust the same.

It is therefore an object of the instant invention to provide an improved headrest of the type set forth.

It is another object of the present invention to provide a headrest assembly which can be easily removed from one seat and installed on another, without the use of tools. Another object is the provision of a headrest assembly which can be installed to an automobile seat without causing damage thereto.

A further object is to provide a headrest assembly which will reduce fatigue to the driver of an automobile.

Still another object is the provision of a headrest assembly which can eliminate "whip-lash" injuries to the driver of an automobile in case of rear-end collisions. An additional object is to provide a headrest assembly which can be adjusted for the comfort of the user utilizing ordinary tools.

It is another object of the instant invention to provide a novel headrest construction employing spring steel structural members.

It is another object of the instant invention to provide a headrest assembly utilizing spring steel supports and employing novel support locking means.

It is another object of the instant invention to provide a novel headrest assembly that is inexpensive in manufacture, simple in operation and troublefree when in use.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 2 is a perspective view of the invention.

FIG. 3 is a partial side view of the invention.

FIG. 4 is a top plan view of the invention partly cut away to expose the operating parts.

Figure 1:
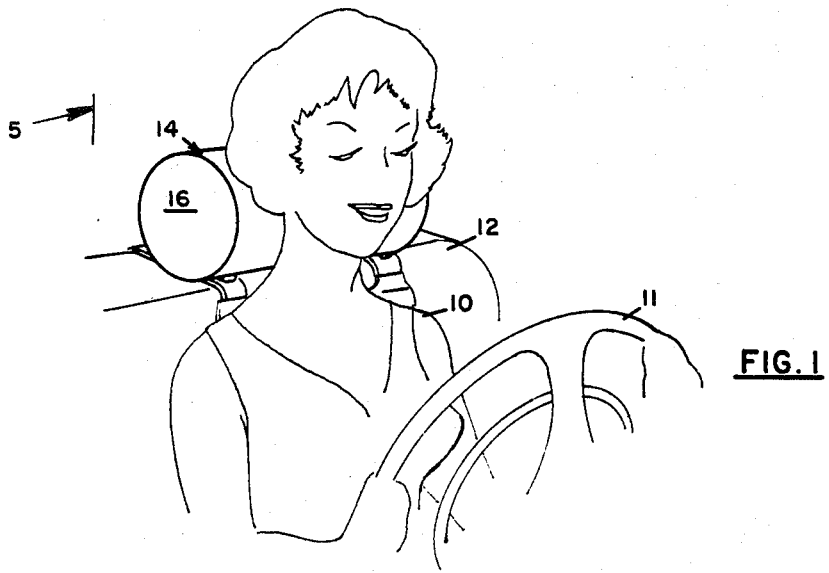
FIG. 1 shows a perspective view of the invention secured to the uppermost portion of the back of an automobile seat.

Although specific terms are used in the following description for the sake of clarity, these terms are intended to refer only to the particular structure of our invention selected for illustration in the drawings and are not intended to define or limit the scope of the invention.

Referring now to the drawings, there is shown in FIG. 1 a driver 10 sitting behind the steering wheel 11, in the driver's seat 12 of an automobile (not shown). Secured to the uppermost portion of the driver's seat 12 is a headrest assembly 14, when installed on the uppermost portion of seat 12 provides a cylindrical pillow 16 in position behind the head of the driver 10.

Referring now to FIGS. 2–4, it can be seen that the headrest assembly 14 comprises a headrest 16 mounted on a pair of identical brackets 18. The brackets 18 are constructed of spring steel and are preformed to substantially a V-shape. Each bracket consists of a pair of legs 20 and 22. Reference character 20 representing the legs that extend over the back of the automobile seat and reference character 22 representing the legs that extend over the front of said seat. Connecting the front and back legs at each pair is an accurately curved bar 24. Secured to the top of each bar 24, by way of a wing nut 26, is an L-shaped support member 28, which member carries the pillow 16 at the unsecured end.

Secured to the front two legs 22 is a flat pillow 30. A pair of openings 32 are provided in pillow 30 to allow for the insertion of the front legs 22 therein. The weight of the driver's body against the pillow 30 serves to anchor the headrest assembly in place. Further the pillow 30 provides additional comfort for the user.

Figures 5, 5A:
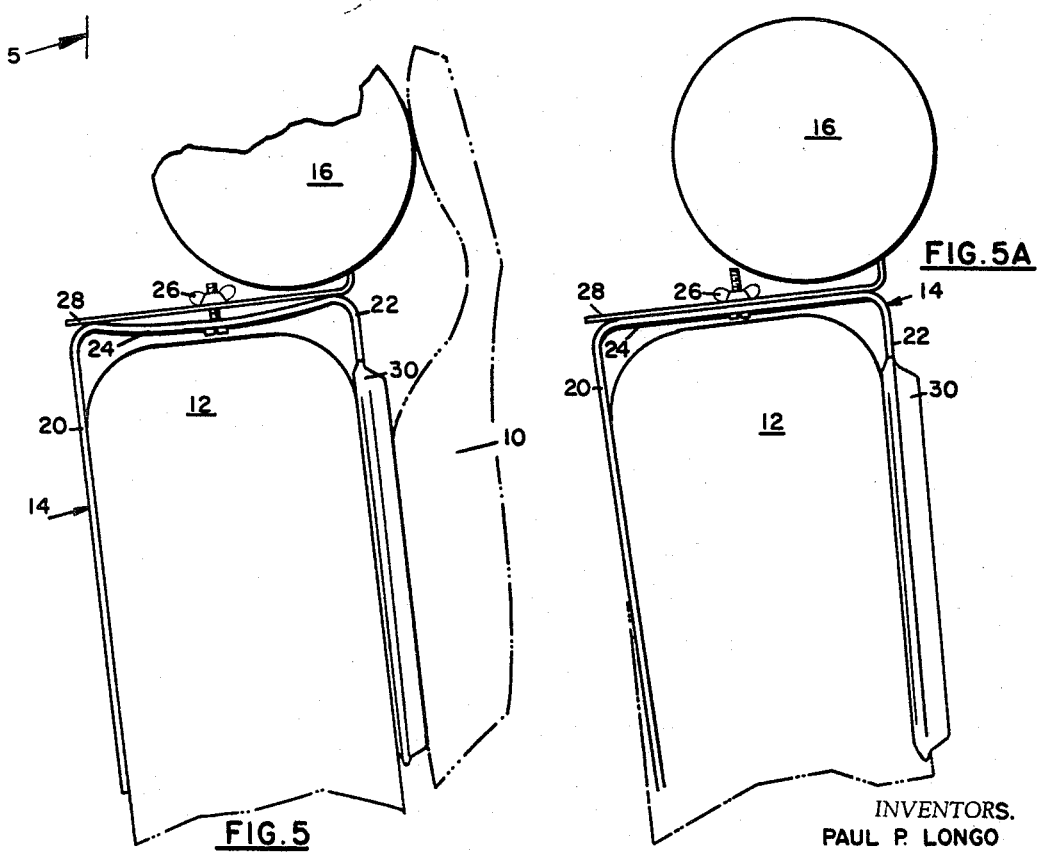
FIG. 5 is a side elevational view of the invention in the unlocked condition.
FIG. 5a is a side elevational view of the invention in the locked condition.

Referring now to FIGS. 5 and 5a it will be observed that where the spring steel brackets 18 are tightened by the wing nuts 26, the top accurately curved bar 24 flattens (see FIG. 5a) and thus increases spring tension against the seat to lock the headrest assembly in position. The unlocked position, which is before the wing nuts 26 are tightened, is shown in FIG. 5. The wing nut 26 can be utilized in any of the holes 34 in the L-shaped member 28 to allow for horizontal adjustment of the headrest. It is thus seen that the spring steel construction of the brackets 18 serves to clamp the headrest assembly 14 to the back of the automobile seat. Once the brackets have been positioned the spring bias can be increased by flattening the arched member 24 against the L-shaped members 28 through the action of the wing nut 26.

Obviously many modifications and variations of the present invention are possible in light of the above teachings. It is therefore to be understood that within the scope of the appended claim, the invention may be practiced otherwise than so specifically described.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:
1. A headrest assembly used for giving support and comfort to an automobile rider by attaching to the back of an automobile seat comprising
  (A) a pair of spaced, V-shaped brackets,
    (1) each bracket including an upper horizontal web and front and rear legs depending therefrom,
      (a) said legs forming an angle of approximately sixty degrees with the said web;
  (B) a transverse yoke integrally connecting the said brackets at the respective webs thereof;
  (C) spring means biasing the said front and rear legs together,
    (1) said means including an arcuate bend in the said web,
    (2) said spring means comprising an integral length of flat spring steel for each said bracket,
      (a) said spring steel length being formed to the said V-shape,
  (D) L-shaped brackets respectively adjustably affixed to the said webs,
    (1) said brackets overlying the said webs, and
    (2) each said bracket having a flat, horizontal member in contact with the said webs;
  (E) tightenable fastening means connecting the said arcuately curved webs and the said L-shaped brackets,
    (1) said fastening means serving to pull each arcuately curved web into flat engagement against the respective said L-shaped bracket; and
  (F) a headrest secured to the said brackets.

References Cited
UNITED STATES PATENTS

| | | | |
|---|---|---|---|
| 2,624,397 | 1/1953 | St. Aubin | 297—400 |
| 2,983,310 | 5/1961 | Warlick et al. | 297—399 |
| 3,029,107 | 4/1962 | Myers | 297—399 |
| 3,328,082 | 6/1967 | Lilleso | 297—399 |

CASMIR A. NUNBERG, *Primary Examiner.*